J. N. RAMSTAD.
EGG BEATER.
APPLICATION FILED APR. 24, 1909.
959,606.
Patented May 31, 1910.
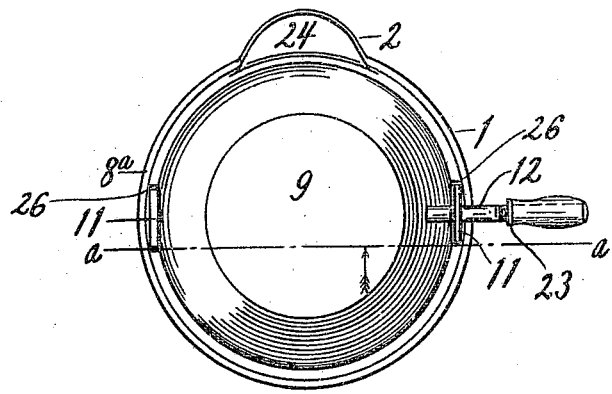
FIG. 1.
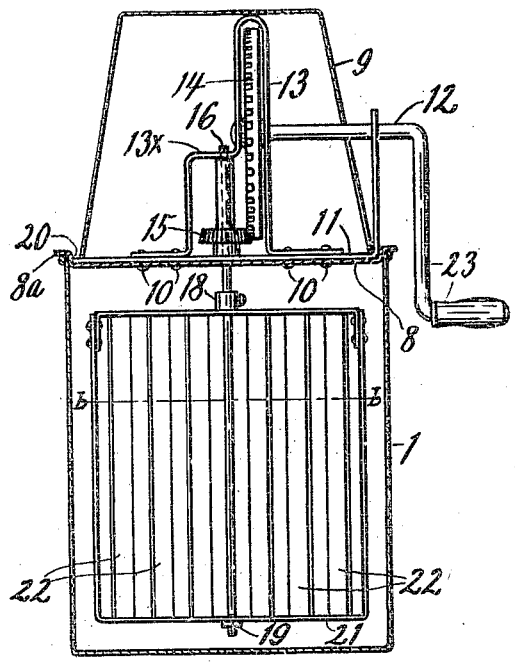
FIG. 2.
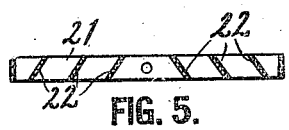
FIG. 5.
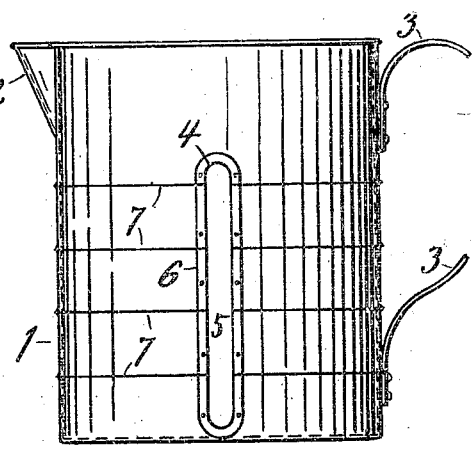
FIG. 3.
FIG. 4.
WITNESSES:
D. E. Carlsen.
E. C. Carlsen.
INVENTOR:
John N. Ramstad.
BY HIS ATTORNEY:
A. M. Carlsen.

UNITED STATES PATENT OFFICE.

JOHN N. RAMSTAD, OF SEATTLE, WASHINGTON.

EGG-BEATER.

959,606. Specification of Letters Patent. Patented May 31, 1910.

Application filed April 24, 1909. Serial No. 492,076.

*To all whom it may concern:*

Be it known that I, JOHN N. RAMSTAD, a citizen of the United States, residing at Seattle, in the county of King and State of Washington, have invented a new and useful Egg-Beater, of which the following is a specification.

My invention relates to improvements in egg-beaters and the object is to provide an efficient, sanitary and easily operated device of said kind.

In the drawing: Figure 1 is a top view of my improved egg-beater with the hand-hold omitted. Fig. 2 is a vertical sectional elevation about as on line $a$—$a$ in Fig. 1. Fig. 3 is a side elevation of the removable metallic cap of the device. Fig. 4 is a side elevation of the main receptacle of the device. Fig. 5 is a cross section of the agitator as on line $b$—$b$ in Fig. 2.

Referring to the drawing by reference numerals, 1 designates the main receptacle adapted to contain the eggs or other ingredients to be mixed or beaten. Said receptacle has a spout 2, hand-hold 3, and a vertical slot 4 in its side. Said slot is covered by a piece of mica, 5, secured water tight to the receptacle by a metallic rim 6.

The receptacle may be provided with horizontal lines 7 placed at certain distances from each other to indicate the amount of ingredients as seen through the gage glass or mica 5.

The receptacle is provided with a snugly fitting cover 8, which is adapted to receive a cap 9 for a purpose to be presently described.

The offset rim $8^a$ of the cover 8 projects slightly outside the edge of the receptacle and as the cover itself fits somewhat tight, dust and dirt cannot reach the inside.

Diametrically on the cover is pivoted at 10, one arm of an L-shaped bar 11, the vertical arm of which forms a journal near its upper end for the horizontal shaft 12. Said shaft 12 is also journaled in the two arms of the inverted U-shaped portion of a frame bar 13 secured to the cover and the bar 11. Between the arms of said U-shaped portion of the bar 13, is secured on the shaft 12, a bevel gear 14, meshing with a bevel pinion 15 which is secured on a vertical shaft 16 journaled in the cover and in the horizontal portion $13^x$ of the frame 13.

The vertical shaft 16 extends downwardly through the cover almost to the bottom of the receptacle and on said suspended portion of the shaft is secured at 18 and 19 a beater or agitator, composed of a rectangular frame 21, in which are secured vertical wings or beaters 22, an equal number on each side of shaft 16.

The wings, or set of wings, on one side of the shaft all slant in one direction and those on the other side slant in another direction (as best shown in Fig. 5), so that when the crank 23 is turned the beater or agitator is turned and the wings on one side tend to force the contents of the receptacle outward and the other wings tend to force it inward, thus causing a rapid and effective means of stirring and beating the eggs or other contents very thoroughly and effectively.

The cap 9 is adapted to fit snugly in the annular recess 20 of the cover 8 and the rim of the cap has an enlargement 24 on one side adapted to cover the opening of the spout 2. The slot 25 (see Fig. 3) is to allow the cap to be put down over the shaft 12, and the rim is partly cut away at 26 to make room for the frame arm 11. The main purposes of the cap are to cover the gears and to prevent dust and dirt from reaching the contents of the receptacle.

Having thus described my invention, what I claim is:

An egg-beater comprising a vessel, or receptacle, with a removable cover, a frame fixed upon the cover, a horizontal shaft journaled in the frame and having at its outer end a crank and at the inner end a bevel gear, an agitator shaft journaled in the frame and suspended in a vertical central position in the vessel, a skeleton agitator fixed on said shaft within the vessel, said agitator having vertically disposed flat wings some of which are so inclined as to gather the contents of the vessel toward the shaft and some wings being inclined in the opposite direction so as to spread the contents away from the shaft, said cover having an annular recess at its top, and a cap adapted to cover up the gearing and frame
5 for same and having a rim about its base adapted to engage frictionally in the recess of the cover.

In testimony whereof I affix my signature, in presence of two witnesses.

JOHN N. RAMSTAD.

Witnesses:
GUSTAV BENSON,
JOHN ADMAN.